(12) United States Patent
Huber et al.

(10) Patent No.: US 6,200,004 B1
(45) Date of Patent: Mar. 13, 2001

(54) LIGHT DIFFUSER DEVICE

(75) Inventors: Mortimer Huber, White Bear Lake; Salvador Mendez, Roseville, both of MN (US)

(73) Assignee: Quality Manufacturing Incorporated, St. Paul, MN (US)

( * ) Notice: Subject to any disclaimer, the term of this patent is extended or adjusted under 35 U.S.C. 154(b) by 0 days.

(21) Appl. No.: 09/052,629

(22) Filed: Mar. 31, 1998

(51) Int. Cl.$^7$ ................................................ F21V 14/00
(52) U.S. Cl. ..................... 362/255; 362/26; 362/256; 362/355; 428/38; 428/46
(58) Field of Search ........................ 359/900, 255; 362/96, 26, 355, 102, 351, 31, 259, 255, 357; 40/547; 47/47; 313/511; 385/146; 428/34, 46, 38, 345

(56) References Cited

U.S. PATENT DOCUMENTS

| | | | |
|---|---|---|---|
| 3,037,137 | * | 5/1962 | Motson ................................ 313/511 |
| 4,099,535 | * | 7/1978 | Hubachek ............................. 362/102 |
| 4,775,222 | * | 10/1988 | Ohe ........................................ 362/26 |
| 5,032,711 | * | 7/1991 | Yamada ................................. 362/255 |
| 5,528,720 | * | 6/1996 | Winston et al. ...................... 385/146 |
| 5,667,289 | * | 9/1997 | Akahane et al. ........................ 362/31 |

OTHER PUBLICATIONS

Product Data Bulletin #151 from Avery™ Dated Jul. 1996 (1 page).
Product Data Bulletin from Avery®, Specification™29288, Dated Jan. 1998 (1 page).
Americans With Disabilities Act of 1990 (20 pages total, pp. 31–50).
36 C.F.R. Ch XI, Pt. 1191, App. A, 4.4 Protruding Objects (Jul. 1, 1996 Edition) (2 pages total, pp. 688–689).

\* cited by examiner

*Primary Examiner*—Sandra O'Shea
*Assistant Examiner*—Bertrand Zeade
(74) *Attorney, Agent, or Firm*—Michael S. Sherrill

(57) ABSTRACT

There is disclosed a light diffusing device that includes a transparent base layer with a diffuser layer over it. The diffuser layer is formed of multiple light diffusing elements. These elements are preferably diamond-like in shape and are substantially in alignment. The diffusing elements, arranged in this manner serve to uniformly diffuse light, typically as emitted from fluorescent tubes, to which the device or devices is/are typically attached, such that areas of greater intensity, known as "hot spots" and areas of lesser intensity, known as "shadows" are eliminated, and viewers have difficulty determining the direction of the fluorescent tubes. The device can be flat, and when combined with adhesive forms a tape, that may include a backing member, inert to the adhesive, for storage. Tubular devices are also permissible.

8 Claims, 5 Drawing Sheets

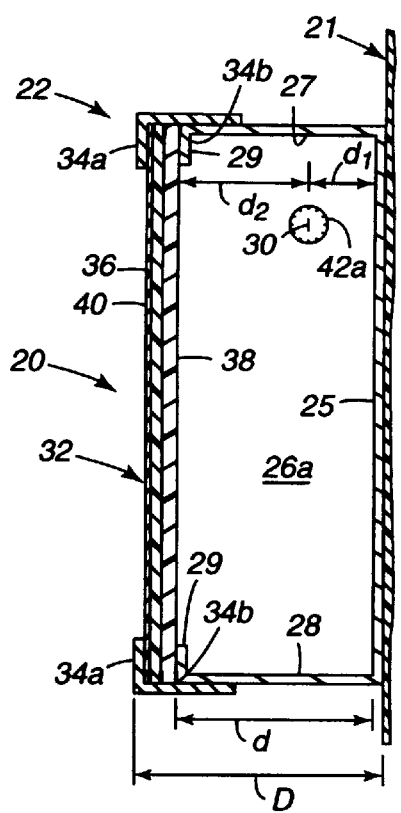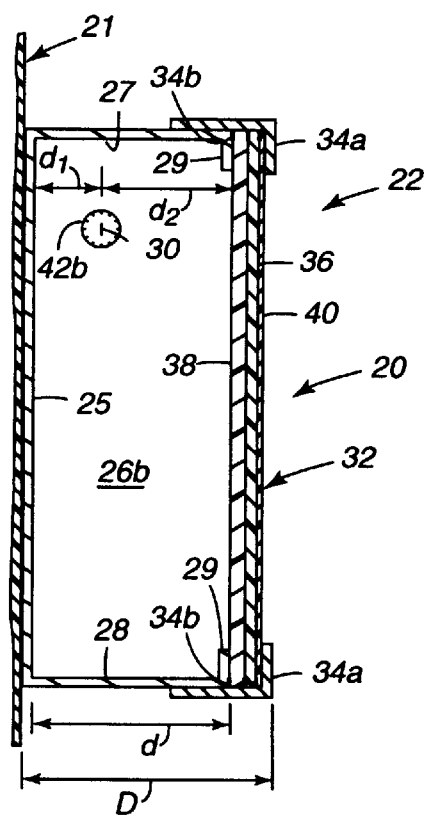
Fig. 2a
(Prior Art)
Fig. 2b
(Prior Art)

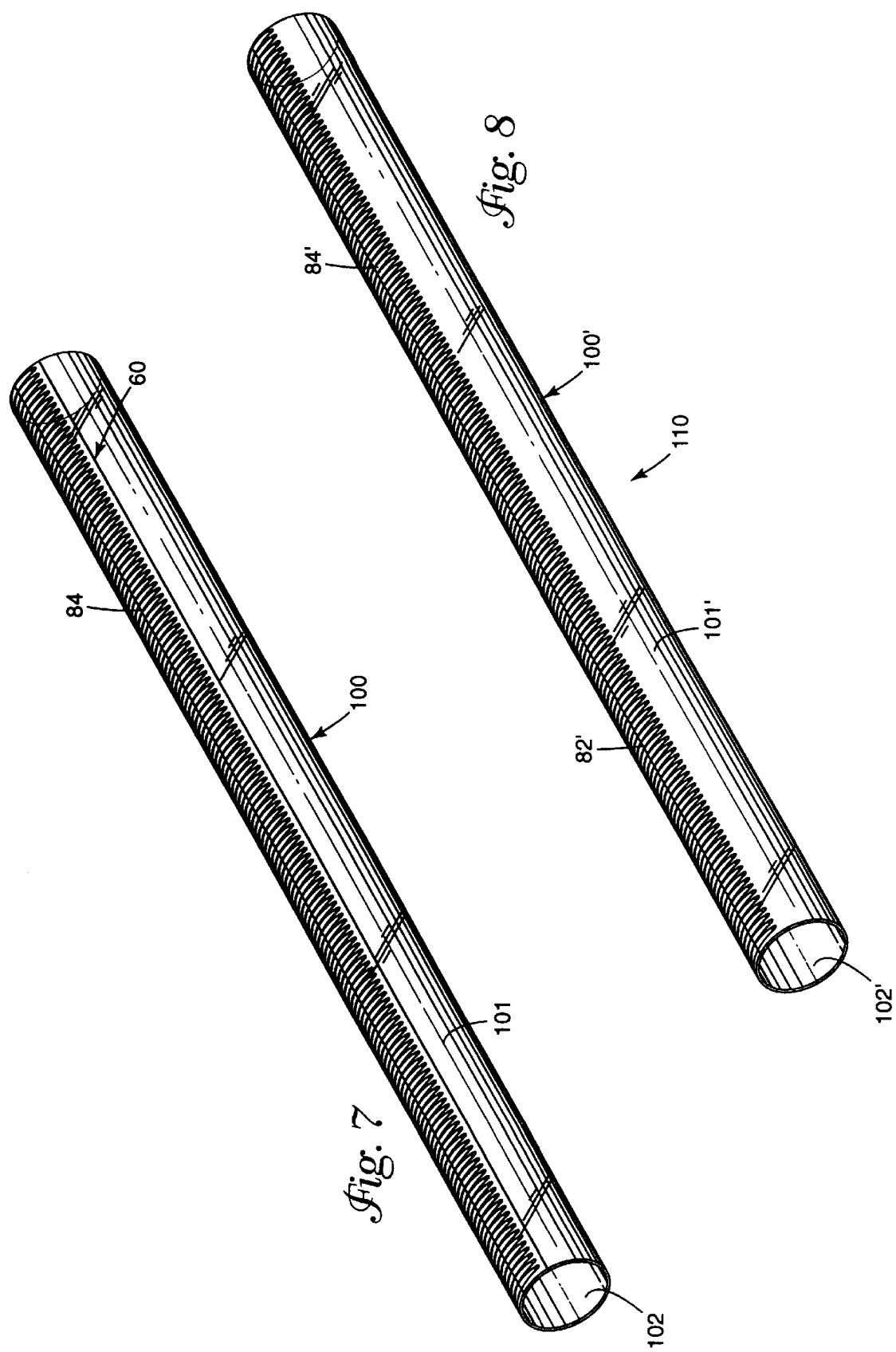

LIGHT DIFFUSER DEVICE

FIELD OF THE INVENTION

The present invention is directed to a device for enhancing the diffusion of the light emitted from a light source. Typical light sources include fluorescent tubes, also known as fluorescent bulbs or fluorescent lamps. These fluorescent tubes may be employed in cabinets or light boxes of signs, such that when the devices of the present invention are used in conjunction with the fluorescent tubes in these signs, the depth of the cabinets, and ultimately the depth of the signs can be reduced, when compared to conventional signs.

BACKGROUND OF THE INVENTION

Signage is common for basic communications and is the most popular form of advertising worldwide. Advertising signage, for example, is extremely effective in the form of illuminated point of purchase signs, commonly found in airport terminals, bus and train stations, sporting arenas or stadiums, convention centers, hotels, and other public walkways, or places of high pedestrian traffic. These signs are decorative multi color arrays and are retained in outwardly protruding illuminated cabinets or light boxes, the cabinets mounted on a wall, or other stable support structure, for example, a balcony front at a sporting arena or stadium.

An exemplary sign 20 of overall length (L) and overall depth (D) is mounted on a wall 21, as illustrated in FIGS. 1, 2a, and 2b. These drawing figures are diagrammatic, to illustrate the structures detailed below and accordingly are not to scale. This sign 20 includes a cabinet 22 (also known as a light box), of sheet metal or the like, with a body 24, having rear 25, side 26a, 26b, upper 27 and lower 28 walls and an open front (side). The body 24 may also include borders 29 (continuous or non-continuous along the periphery of the open side of the cabinet body 24), affixed to the cabinet walls 26a, 26b, 27, 28 by conventional mechanisms, to assist in preventing the graphic unit 32 from moving (or being pushed) into the cabinet 22. The borders 29 preferably have their outermost surfaces flush with the edges of the side 26a, 26b, upper 27 and lower 28 walls at the open side of the cabinet body 24, and may include an indented section (not shown), typically referred to as a screw trough, for receiving screws 35, rivets or the like.

The cabinet 22 encloses lights, for example, 800 milliamp (ma) fluorescent tubes 30 (also referred to as fluorescent bulbs or fluorescent lamps), of lengths ranging from eighteen inches to ten feet (46 cm to 305 cm), and diameters typically approximately 1.5 inches (3.81 cm), or other suitable illuminating devices. In this sign 20, the fluorescent tube arrangement(s) are exemplary, and additional similar arrangements within the cabinet 22 are permissible if desired.

A graphic unit 32 is positioned in a retainer 34 (frame). This retainer 34 holds the graphic unit 32 in place against the cabinet body 24, as the graphic unit 32 abuts the edges of the side 26a, 26b, upper 27 and lower 28 walls and the borders 29. The retainer 34 is made of individual members 34a, preferably four (one for each cabinet periphery side), each member having lips 34b that abut the edges of the side 26a, 26b, upper 27 and lower 28 walls when the sign 20 is properly formed. Each of the members 34a that form the retainer 34 attach to the cabinet body 24 by clamping screws 35, conventional threaded screws received in openings in the cabinet body 24, latches, hinges, or other similar attachments. When any retainer member 34a is removed from the cabinet body 24, the graphic unit 32 can be removed by being slid therefrom. Other conventional retainers for the graphic unit 32, such as friction fitting members, are also permissible.

The graphic unit 32, typically includes a graphic 36 (typically a transparency), sandwiched between a diffuser panel 38 (typically a translucent polymeric or plastic sheet), oriented rearward toward the cabinet rear wall 25 and a protective cover member 40 (typically a transparent or clear polymeric material), held in contact by the sandwich arrangement. The cabinet 22 has an internal length (1), from the innermost surface of the sidewall 26a to the innermost surface of the opposite sidewall 26b, and an internal depth (d), from the rear wall 25 to diffuser panel 38 (alternately expressed as the distance from the rear wall 25 to the plane formed by the edges of the side 26a, 26b, upper 27 and lower 28 walls along the open side of the cabinet body 24).

In the sign 20, the internal cabinet length (1) is 10 feet (3.04 m) or less, as it includes a single fluorescent tube 30 or tubes, depending on the sign height, that span or spans the entire internal cabinet length (1). This fluorescent tube 30 is received in electrical connection and coaxial alignment with the respective sockets 42a, 42b (the center point of the socket substantially aligned with the center point of the fluorescent tube). For example, these sockets 42a, 42b, may be KULKA brand lamp sockets Cat. No. 582, 660 W–600 V/1000 V, available from Voltarc Technologies, Inc., 400 Captain Neville Drive, Waterbury, Conn. 06705, USA. The sockets 42a, 42b are mounted on oppositely disposed sidewalls 26a, 26b of the cabinet 22. These sidewalls 26a, 26b may be of variable thickness to define wireways or raceways, which accommodate electrical hardware (wiring) for the sockets 42a, 42b. At least one of the sockets, shown here as socket 42a mounted on sidewall 26a, is spring loaded (depressably mounted) by a spring mechanism, to allow for easy fluorescent tube 30 removal, by depressing the spring loaded socket 42a.

The arrangement of the fluorescent tubes 30 in the cabinet 22 of the sign 20, determines the internal cabinet depth (d), that serves to establish the overall sign depth (D). The internal cabinet depth (d) is less than the overall sign depths (D), as this overall depth (D) accounts for the thickness of the cabinet rear wall 25, any retainer portions that do not overlap with the cabinet body 24 (the non-overlapping portions of the retainer 34 including the graphic unit 32). This internal depth "d" is a combination of two distances, "$d_1$", the cabinet rear wall to socket center/fluorescent tube (light) center distance, and "$d_2$", the socket center/fluorescent tube center to diffuser panel 38 distance.

The distance ($d_1$) between the rear wall 25 and the socket center/fluorescent tube center is determined by the distance needed to separate the fluorescent tube 30 from the cabinet rear wall 25. This distance ($d_1$) is based on socket dimensions and safety concerns. For example, this distance may be approximately 1.1875 inches (3.02 cm) or greater.

The distance between the socket center/fluorescent tube center and the diffuser panel ($d_2$) is in accordance with industry standards. It is the distance between the socket center/light center and the diffuser panel 38, where the light diffuses uniformly throughout the cabinet 22, such that: 1) the viewer sees the graphic illuminated at a uniform intensity distribution, as opposed to areas of greater intensity, known as "hot spots" and lesser intensity, known as "shadows"; and 2) the viewer has difficulty in determining the direction of the fluorescent tubes (lights) 30 in the cabinet 22. Typically, this distance is approximately 4 inches.

The combined distances, the sum of which is the respective internal cabinet depth, d, for the sign 20 is greater than four inches (due largely in part to the $d_2$ distance of approximately 4 inches), whereby the overall cabinet depth D, for the sign 20, is also greater than four inches. The resultant sign 20, when mounted on a wall 21 or the like, extends (protrudes) more than four inches therefrom, and is thus, commonly referred to and classified as "high profile."

"High profile" signs, such as the sign 20 shown, exhibit substantial drawbacks. The "high profile" cabinet does not conform with the Americans With Disabilities Act Of 1990 (ADA), and in particular the ADA, at 36 CFR XI (7-1-96 Edition), Pt. 1191, App. A, Section 4.4.1. This section requires that "Objects projecting from walls with their leading edges between 27 and 80 in (685 mm and 2030 mm) above the finished floor shall protrude no more than 4 in (100 mm) [(100 mm as converted by the ADA)] into walks, halls, corridors, passageways, or aisles."

The technology associated with the conventional sign 20 and the like, is not suitable with "low profile" signs, as "low profile" signs extend not greater than approximately four inches from walls. This is because simply decreasing the distance between the socket center/fluorescent tube center and the diffuser panel ($d_2$), does not allow for the uniform diffusion necessary for proper aesthetics. Rather, the diffusion and subsequent light distribution in the cabinets would be uneven, resulting in unaesthetic hot spots and shadows. Moreover, the viewer could easily visibly distinguish the direction of the fluorescent tubes in the cabinet.

To conform with the ADA, this conventional "high profile" sign 20, and others like it, with cabinets of greater than four inch depths, must be placed into the walls, by cutting the walls and setting the cabinets back into them. This retrofitting is expensive and destructive to the walls, and should the wall be a structural or load bearing wall, this retrofitting is not possible.

SUMMARY OF THE INVENTION

The present invention overcomes the problems of the prior art by providing a device that when placed into contact with the lights or other illumination source, preferably in the light box or cabinet of a sign, diffuses the light emitted therefrom. This diffusion is sufficient, such that viewers see the graphic illuminated at a uniform intensity distribution, as opposed to areas of greater intensity, known as "hot spots" and lesser intensity, known as "shadows", and the viewers have difficulty in determining the direction of the fluorescent tubes in the sign cabinet, where the directions of the fluorescent tubes therein can not be determined. Use of the device of the present invention with fluorescent tubes allows for the distance between the fluorescent tube(s) (light) and the diffuser panel in the sign cabinet or light box to be reduced, as compared to the prior art sign cabinets or light boxes. As a result, the sign cabinets can be reduced in depth, such that the resultant signs are of depths not greater than four inches, whereby the sign is considered to be "low profile".

The present invention is directed to a light diffusing device that includes a transparent base layer with a diffuser layer over it. The diffuser layer is formed of multiple light diffusing elements. These elements are preferably diamond-like in shape and are substantially in alignment. The diffusing elements, arranged in this manner serve to diffuse light, typically as emitted from fluorescent tubes, to which the device or devices is/are typically attached. The device can include adhesive to form a tape, that can be placed into temporary contact with a backing member, inert to the adhesive, for storage prior to use. The device can also be in a tubular form.

BRIEF DESCRIPTION OF THE DRAWINGS

The present invention will be described with reference to the accompanying drawings wherein like reference numerals indicate corresponding or like components. In the drawings:

FIGS. 2a and 2b are cross sectional views of the high profile sign of FIG. 1 taken along lines 2a—2a and 2b—2b respectively (only one fluorescent tube is shown);

FIG. 7 is a perspective view of a tubular member for enclosing a fluorescent tube with the device of the present invention, in the form of a tape attached thereto; and FIG. 8 is a perspective view of a second embodiment of the present invention.

DETAILED DESCRIPTION OF THE DRAWINGS

Figure 1:
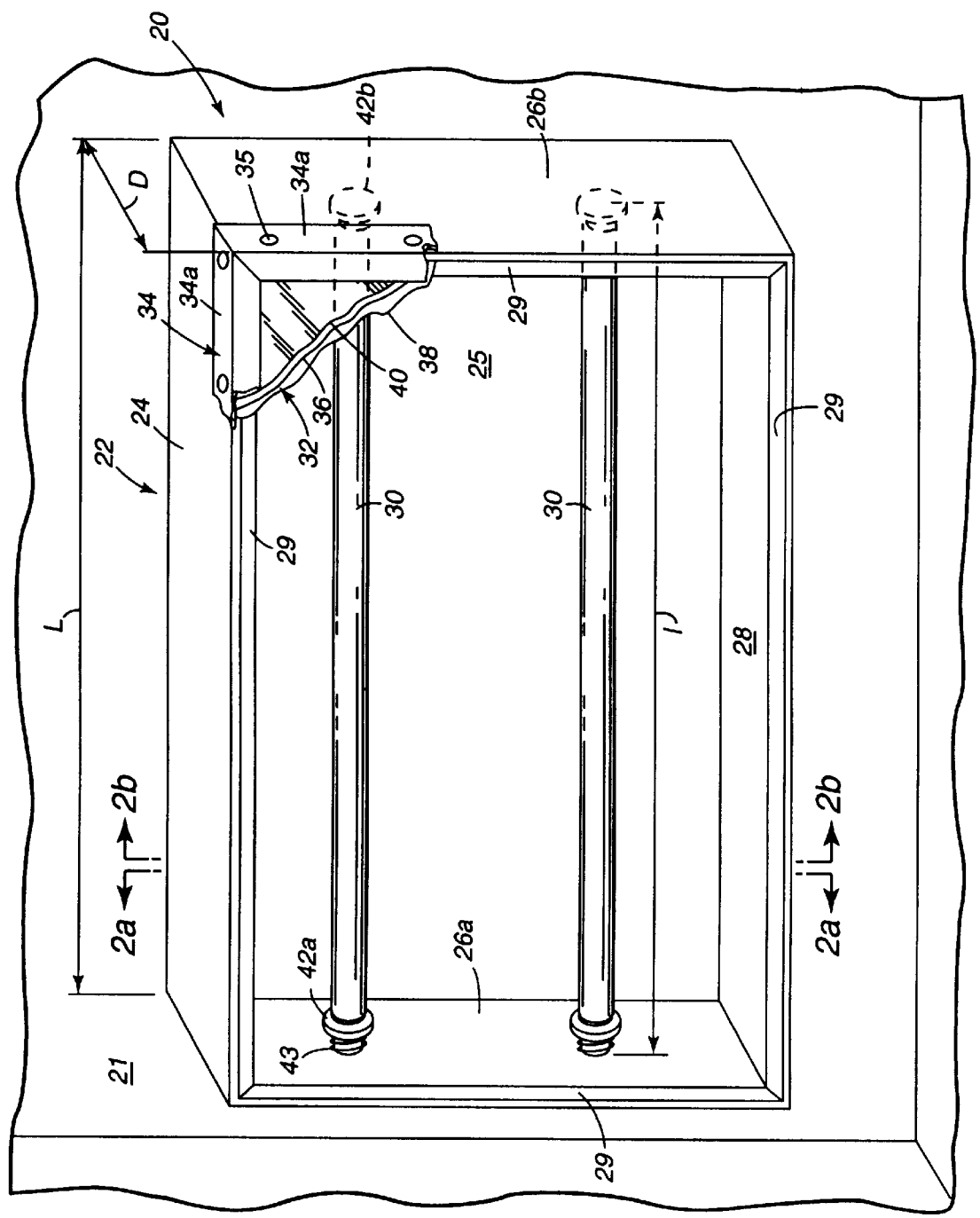
FIG. 1 is a perspective view of a high profile sign in accordance with the prior art, with the retainer and graphic unit partially cut away.

In the description of FIGS. 3–8 below, components of the sign 50, similar to those of the prior art sign 20, detailed in FIGS. 1–2b above, will employ the same reference numerals. Also, these similar components are of the same construction and materials as those detailed above.

Figure 3:
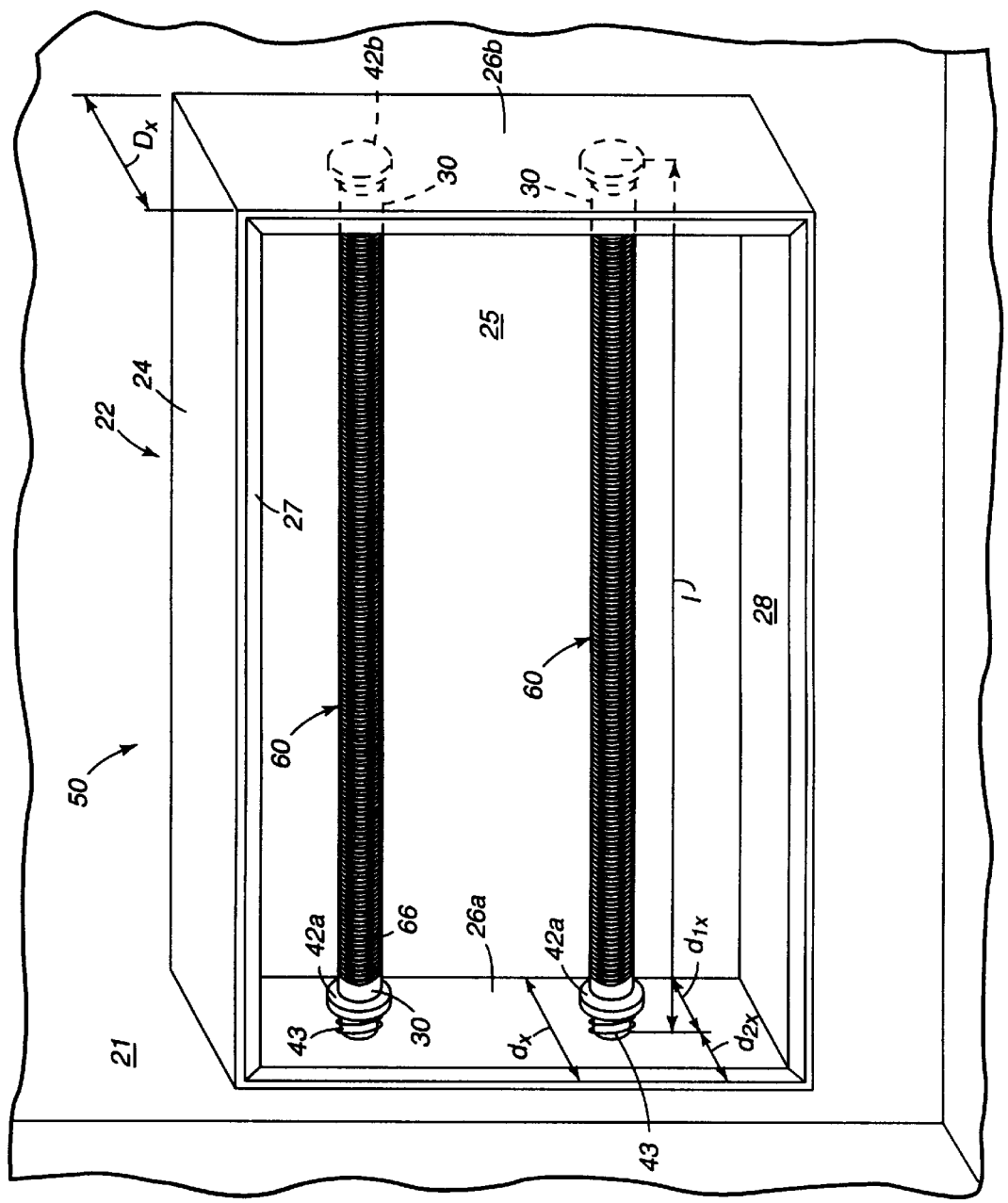
FIG. 3 is a perspective view of a first embodiment of the present invention in operation in a light box cabinet of a low profile sign, with the border, retainer and graphic unit removed, to highlight the present invention.

FIG. 3 shows a first embodiment of the present invention, a substantially flat (strip-like) device 60, preferably in the form of a tape. The device 60 is attached to a fluorescent tube 30, the fluorescent tube 30 employed as part of the sign 50. The sign 50 also preferably includes borders attached to the cabinet walls 22, and includes a retainer and graphic unit, all identical to that described above for the sign 20, designed for placement on the sign 50 as described above, but not shown. The following description of the device 60 as incorporated in the sign 50 is exemplary only, as this device 60, as well as the device 110 of the second embodiment (FIG. 8), is not limited to signage, and fluorescent tubes associated therewith.

The device 60 is preferably in to form of a flat strip, with a single or multiple strips suitable for placement on fluorescent tubes 30 in a cabinet 22. The fluorescent tubes 30 are electrically connected and mounted in sockets 42a, 42b, with at least one of the sockets, here socket 42a is spring loaded (depressably mounted on the sidewall 26a), by a spring mechanism 43, as detailed above. This drawing figure, is diagrammatic (and thus, not to scale), with the fluorescent tubes 30, sockets 42a, 42b, spring mechanisms and the device(s) 60 exaggerated in size to emphasize the invention. Also, while two fluorescent tubes 30 are shown, this is exemplary only, as the number of fluorescent tubes may be varied in accordance with the desired sign.

The device 60 or devices is/are preferably attached to the surface 66 of the fluorescent tube 30 in an orientation facing the cabinet front, toward the graphic unit 32, such that the device(s) 60 diffuses the light (light rays) emitted from the respective fluorescent tube 30. The light diffusion, resulting from the device 60, produces a substantially uniform distribution of light within the cabinet 22, such that when the graphic unit 32 is in place and the sign is illuminated, the viewer has difficulty determining the direction and position of the fluorescent tube 30, and "hot spots" (areas of great light intensity) and "shadows" (areas of low light intensity) are eliminated. Although it is preferred to attach the device (s) 60 to the fluorescent tube surface 66 that is closest to the graphic unit 32, other orientations and placements are also sufficient provided uniform light distribution throughout the cabinet is achieved and the viewer has difficulty determining the direction and position in the cabinet of the fluorescent tube 30. Moreover, although a single row of at least one device 60 is shown, multiple rows of at least one device 60 on each fluorescent tube 30 are also permissible.

This uniform light distribution, produced by the device 60 of the present invention, allows for the distance between the socket center/fluorescent tube center and the diffuser panel ($d_{2x}$), to be substantially reduced when compared to the corresponding distance ($d_2$) in the prior art sign 20. The distance between the cabinet rear wall 25 and the socket center/fluorescent tube center ($d_{1x}$), is determined by the sockets employed (as discussed above), and is approximately equal to the corresponding distance ($d_1$) in the prior art sign 20. With this fluorescent tube center to diffuser panel distance ($d_{2x}$) reduced, the internal cabinet depth ($d_x$), ($d_x = d_{1x}+d_{2x}$), results in the sign 50 with an overall cabinet depth ($D_x$) of 4 inches or less, making it a "low profile" cabinet. Therefore, the resultant sign 50 is a "low profile" sign and in compliance with the ADA.

Figure 4:
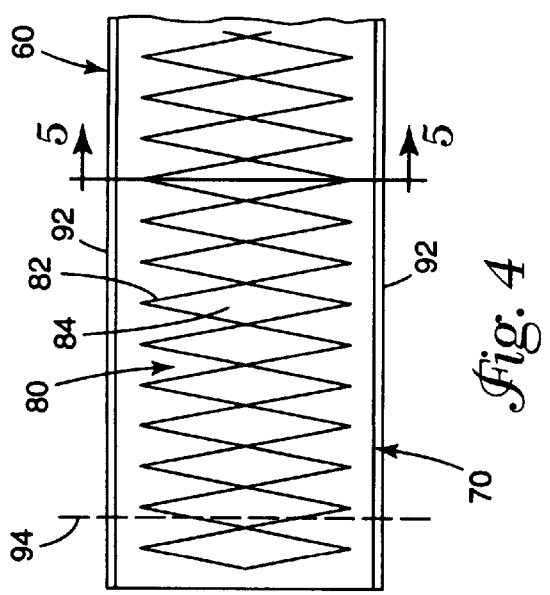
FIG. 4 is a top view of the first embodiment attached to a backing member prior to use.
Figure 5:
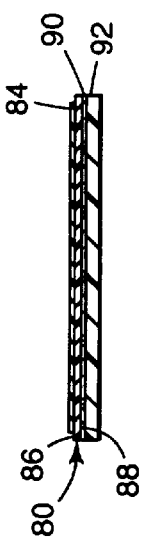
FIG. 5 is a cross-sectional view of the first embodiment taken along line 5—5 of FIG. 4.

Turning also to FIGS. 4 and 5, there is shown the device 60 prior to its application on a fluorescent tube 30, or other light emitting device (as shown and described in FIG. 3). It is preferred that this device 60 have an adhesive backing to attach to the fluorescent tube 30 (FIG. 3) or other similar light emitting device, without any additional fastening structures. The device 60 includes a base 80 or base layer, with a diffuser or upper layer 82, formed of light diffusing elements 84 on a first side 86. A second side 88, opposite the first side 86, preferably includes an adhesive layer 90. The device 60 is preferably contacted to an inert backing member 92 along the adhesive layer 90, keeping this layer 90 free of contaminants, for storage prior to use of the device 60, in this tape form. For example, the device 60 in this tape form may be in multiple strips stacked vertically along a sheet of the backing member 92, a long strip, or a strip that is rolled up. The device 60 may be cut into smaller pieces in any of these storage forms.

The device 60 alone, or along with the backing member 92 may include a weakened portion 94, formed by an incision or the like, for enhancing the separation of the device 60 from the backing member 92, when use is desired. The weakened portion 94 can also be a widthwise slit (shown), and could also be at the corner extending from the edges of the adjacent sides, can be rounded, or any combination of geometries, provided ease of separation is accomplished. The backing member 92 may also include additional incisions (weakened portions) in accordance the incisions above.

The base layer 80 is preferably transparent but can also be translucent. To the viewing eye in ordinary light this base layer 80 is clear. This base layer 80 is preferably made of materials such as polymers, including vinyls, in sheets or films. As shown in FIG. 3, the base layer 80 is of a conformable nature, such that it is able to conform to the curved outer contours of a light element, such as a fluorescent tube 30. The thicknesses of these sheets or films can be in accordance with the desired application.

The diffuser layer 82 is formed of elements 84, preferably diamond (diamond-like) in shape. These elements 84 are preferably aligned, spaced apart from each other, and extend almost the entire width of the base layer 80. However, these elements 84 need not be aligned, can contact or overlap each other and may extend the entire width of the base layer 80. Combinations of these features are also acceptable. Additionally, other shapes such as "X", ovals, dots, or combinations thereof, are also acceptable in accordance with the above arrangements on the base layer 80.

The elements 84, that are preferably opaque, are made of materials including ultraviolet (UV) ink, preferably opaque and of a white hue, such as commercially available UV white silk screening inks, and ultraviolet paint, preferably opaque and of a white hue, also commercially available, or mixtures thereof. These inks, paints, or mixtures thereof may then be applied to the base layer 80, preferably in the diamond shape (although other shapes are permissible, as detailed above) by screening, spraying or other similar coating operation over a mask, pattern, or the like.

The adhesive layer 90 is preferably along the entire second side 88 of the base layer, but may be along portions thereof as well. The adhesive is preferably an acrylic adhesive that is clear (transparent), for example, a clear acrylic pressure sensitive adhesive, coated or placed onto the base layer 80 by methods including rolling, screening or other known methods. The backing member may be a waxed paper, Tyvek® (E. I. DuPont de Nemours and Company, Wilmington, Del.), kraft paper or other similar material, inert to the adhesive chosen.

For example, the base layer 80, adhesive layer 90 and backing member 92 are commercially available as a single product, known as AVERY™ XL™ 1000 Series S-652/78B Cast Vinyl film, available from Avery Dennison, Marking Film Div., 150-T, N. Orange Grove Blvd., Pasadena, Calif. 91103, and detailed in AVERY PRODUCT DATA BULLETIN #151 Dated: 07/96, incorporated by reference herein. The elements 84 of the diffuser layer 82 are then formed by first producing a mixture of a clear, e.g., Satin Clear MR-SOP, from Sericol, Inc. 1101 W. Cambridge Circle Dr., Kansas City, Kans. 66103, at approximately 95 volume percent, with a white UV ink, e.g., Super Opaque White UV Ink No. 32–75, from Nazdar, 8501 Hedge Lane Terrace, Shawnee, Kans. 66227, at approximately 5 volume percent. The mixture is then placed onto the vinyl layer (base layer 80 on the upper side 86) of the film by silk screening, with screen having multiple diamond-like shaped portions, each portion corresponding to the respective diamond shaped elements 84 of the diffuser layer 82.

While a tape is preferred, the device 60 can be a flat member, formed only by the base 80 or base layer, with the diffuser layer 82, formed of light diffusing elements 84 on the first side 86. In this case, external fasteners, or an adhesive could be applied to the second side 88 of the base layer 80 or the desired surface, when device 60 attachment is desired. Backing members may be used if desired, should the base layer and/or diffuser layer not be inert with respect to themselves and/or each other.

It should also be noted that the device 60 could be made of various lengths and widths, to accommodate the desired fluorescent tubes 30, or other light sources. Accordingly, should the device 60 be in the tape form, the backing members 92 would be dimensioned accordingly.

Figure 6:
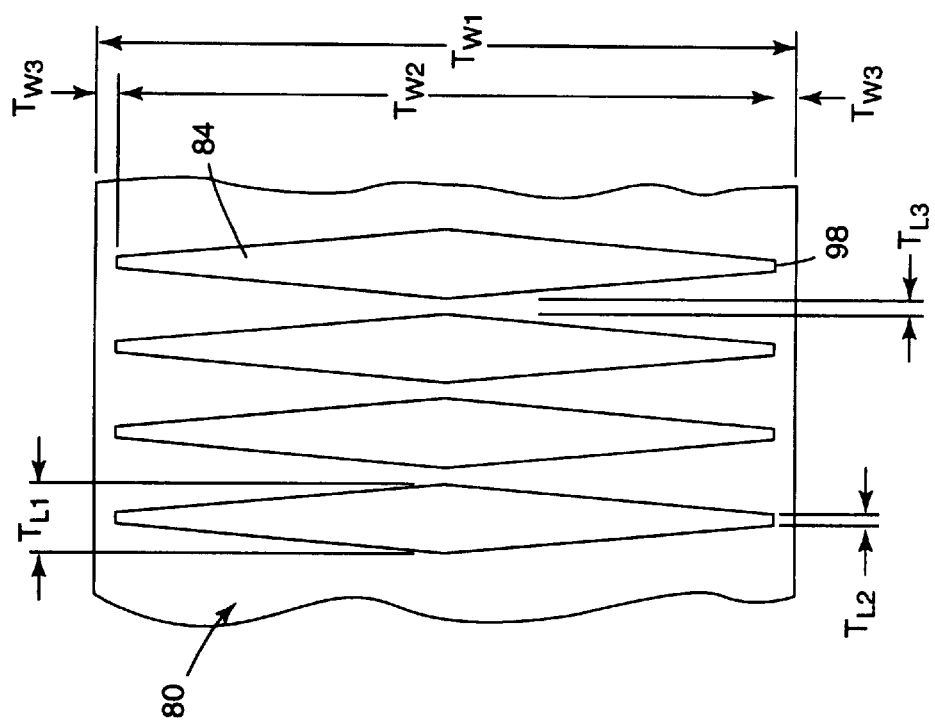
FIG. 6 is a top view of the first embodiment.

For example, a device made in accordance with the device 60 of the present invention, may have a base layer 80 with a thickness of approximately 0.001 to 0.003 inches (0.025 mm to 0.076 mm), the thickness of the adhesive layer 90, approximately 0.001 inches (0.025 mm), the thickness of the elements 84 (diffuser layer 82) approximately 0.001 to 0.003 inches (0.025 mm to 0.076 mm), and the thickness of the backing member 92 approximately 0.001 inches (0.025 mm). Referring to FIG. 6, this example device may be of a variable length and a width ($T_{W1}$) of approximately 1.25 inches (3.18 cm). The diamond shaped elements 84 are approximately 0.125 inches (0.318 cm) at their thickest point ($T_{L1}$) tapering to approximately 0.021 inches (0.053 cm) at the ends 98 (the narrowest points $T_{L2}$). The element 84 length (distance between the ends 98) ($T_{W2}$) is approximately 1.188 inches (3.02 cm), with the distance between the ends 98 and the edges of the base layer 80 ($T_{W3}$) approximately 0.031 inches (0.016 cm).

In an exemplary sign constructed in accordance with the sign 50 of FIG. 3, shown and detailed above, having the device 60 in tape form on the fluorescent tubes 30, the following dimensions are feasible. The distance $d_{1x}$ can be approximately 1.1875 inches, $d_{2x}$ can be as approximately 2.375 inches, such that $d_x$ would be approximately 3.5625 inches. The cabinet 22 can have a depth from outermost edge to outermost edge, in the direction of dimension $d_x$ of 3.625 inches, this dimension including $d_x$ and accounting for thickness of the cabinet rear wall 25. The retainer 34, when placed onto the cabinet 22, can extend forward (including the thickness of the retainer members 34a, that can be approximately 0.060 inches) an additional 0.3438 inches, whereby the resultant sign depth $D_x$ would be approximately 3.9688 inches, placing this sign in compliance with the ADA.

FIG. 7 shows the device 60 (as a tape) applied to a tubular member 100, along its external surface 101. This tubular member 100 is designed to be placed over a fluorescent tube 30, to contain fluorescent tube breakage or the like. The tubular member 100, with the device 60 thereon, is oriented such that the aligned elements 84 are directed toward the diffuser panel 38 (FIG. 1) in accordance with that described above. The tubular member 100 is of a diameter, slightly larger than the fluorescent tube 30, to fit over it, and of a diameter just slightly larger than the outer diameter of the sockets 42a, 42b (FIGS. 1–3), such that it fits snugly thereover, allowing for a friction fit between the inner surface 102 of the tubular member 100 and the outer surface of the sockets 42a, 42b (at the portions of the sockets 42a, 42b of greatest diameter). This frictional engagement, from the friction fit, allows the tubular member 100 to maintain its orientation, such that only sufficient force will move the tubular member 100 with respect to the fluorescent tube 30. Should additional securement of the tubular member 100 to the sockets 42a, 42b be desired, this may be achieved with adhesives or the like. The tubular member 100 is preferably of a thin, clear transparent plastic, such as polyethylene or polypropylene, formed as a rigid cylindrical tube. Other tubular members may be of lengths and diameters to accommodate the fluorescent tubes (or portions thereof) in a snug manner.

FIG. 8 shows a second embodiment of the present invention, where the device 110 is in a tubular form. The device 110 is formed of a tubular member 100'in accordance with the tubular member 100 detailed above (with respect to FIG. 7). The tubular member 100' has an external surface 101' and an internal surface 102'. A diffuser or outer layer 82', formed of light diffusing elements 84', preferably diamond shaped, has been directly placed on the external surface 101' in accordance with any of the methods detailed above. The diffuser layer 82' and elements 84' of identical materials and construction as the corresponding diffuser layer 82 and elements 84, detailed above.

While the present invention has been described above so as to enable one skilled in the art to practice it, the preceding description is exemplary only, and should not be used to limit the scope of the invention. The scope of the invention should be defined by the following claims.

What is claimed is:

1. A light diffusing tape comprising:
  (a) a conformable transparent base layer having first and second major surfaces;
  (b) a diffuser layer over said first major surface of said base layer, said diffuser layer comprising a plurality of light diffusing elements;
  (c) a pressure sensitive adhesive layer in contact with said second major surface of said base layer, and
  (d) a release liner over said adhesive surface.

2. The tape of claim 1, wherein said light diffusing elements are substantially aligned.

3. The tape of claim 2, wherein said light diffusing elements are white.

4. The tape of claim 3, wherein said light diffusing elements are diamond-like in shape.

5. A light diffusing device comprising:
  (a) a tubular member having an external surface; and
  (b) a layer over said external surface, said layer comprising a pattern of light diffusing elements.

6. The device of claim 5, wherein said light diffusing elements are substantially aligned.

7. The device of claim 6, wherein said light diffusing elements are white.

8. The device of claim 7, wherein said light diffusing elements are diamond-like in shape.

* * * * *